May 4, 1954   W. R. McKENZIE   2,677,407
NUT LOCK
Filed April 9, 1945
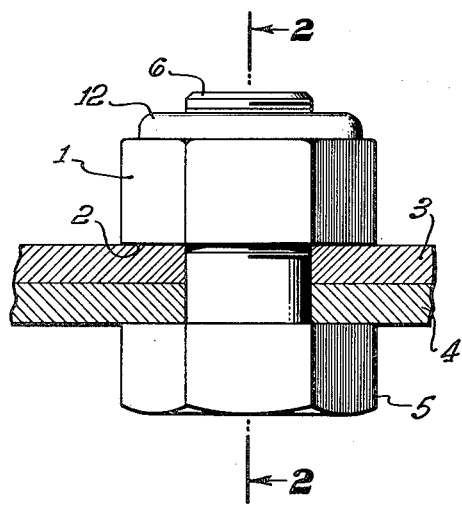
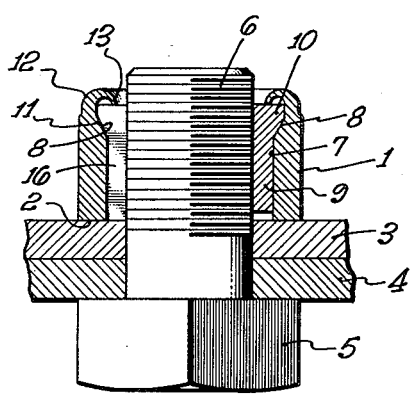
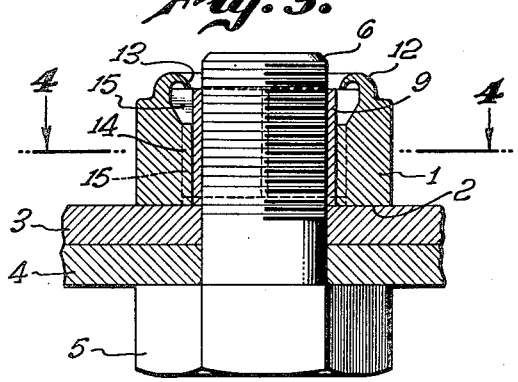
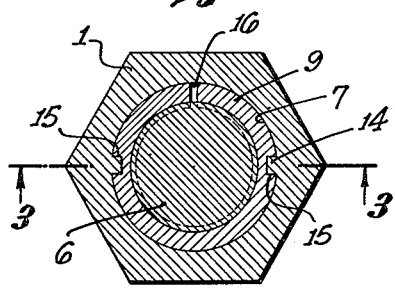
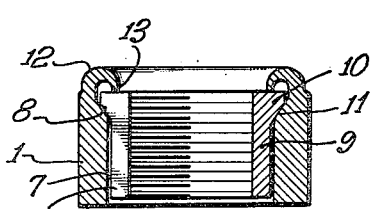
Wendell R. McKenzie,
INVENTOR.
BY Edwin D. Jones,
ATTORNEY Patented May 4, 1954

2,677,407

UNITED STATES PATENT OFFICE 2,677,407

NUT LOCK

Wendell R. McKenzie, Pasadena, Calif., assignor to Bank of America National Trust and Savings Association, as trustee Application April 9, 1945, Serial No. 587,308

1 Claim. (Cl. 151—19)

This invention relates to and has for a purpose the provision of an all metal nut-lock of simple construction which will not work loose under vibration, or by reason of widely varying temperatures.

Under modern conditions to which aircraft are subjected, the temperatures under which they must operate may vary from minus 40° or 50° when the plane is flying at high altitudes in a cold climate, to a very high temperature when the aircraft is located in the tropics and near the ground level. This is a difficult condition for a lock-nut to meet satisfactorily, and, of course, when such a lock-nut is employed on a motor of an aircraft and subjected to heat developed by the motor, the temperature would be raised to even a higher degree.

One of the purposes of this invention is to provide an all metal nut-lock in which its locking action remains effective under such adverse conditions.

In a certain type of nut-lock a principle is employed involving a clamping action of the thread of the nut on the thread of the bolt, and operating to set up a torque-stress or condition frequently referred to as "static torque." Depending upon the amount of static torque developed by the lock nut determines its ability to resist the loosening or unscrewing of the nut resultant of vibration, or varying temperatures.

It is a purpose of this invention to provide a nut lock in which a high degree of static torque is developed and maintained so as to successfully resist loosening or unscrewing of the nut under any and all conditions of vibration and temperatures.

It is also a purpose of this invention to provide a nut lock having means which in its manufacture is adjustable to vary the degree of static torque developed by the nut lock to suit various conditions under which the nut lock is adapted to be used. For example, in the use of the nut lock on aircraft engines where the temperatures are extremely high and the vibrations rapid and intense, a high degree of static torque is requisite to secure the nut against loosening. Under these conditions of use adjustment of the aforesaid means can be made at the time of manufacture so as to develop in the nut lock a static torque which is adequate to prevent loosening or unscrewing of the nut under such conditions.

Further objects of the invention will appear hereinafter.

In the drawing:

Fig. 1 is a section through two clamped plates, and illustrating the lock nut of my invention in side elevation.

Fig. 2 is a view similar to Fig. 1, but representing the lock nut in cross-section, while the threaded shank of the bolt is shown in side elevation.

Fig. 3 is a vertical section through the nut and plates in the plane at right angles to the plane in which the section 2—2 is taken, and on the line 3—3 of Fig. 4.

Fig. 4 is a horizontal section taken on the line 4—4 of Fig. 3.

Fig. 5 is a sectional view similar to Fig. 2 of the nut before it is applied to the bolt.

Referring particularly to Figs. 2 and 4, in practicing the invention I provide a metal nut body or shell member 1, the bottom face 2 of which is adapted to seat upon any parts to be clamped, for example, two sheets or plates 3 and 4. In Fig. 2, these plates are illustrated as clamped against the head 5 of a bolt, the threaded shank 6 of which is surrounded by the body 1. This body has a chamber or socket 7 within it, which in the present instance, is of cylindrical form, but toward the outer end of the nut, a tapered or conical seat 8. The chamber or socket 7 form a bore, the inner or lower portion of which, as seen in Fig. 3, is cylindrical and the outer or upper portion of which is frusto-conical with its larger diameter towards the outer end of the shell member. The socket 7 is of considerably larger diameter than the shank 6 of the bolt so that an annular space is provided to carry a constrictable metal sleeve or inner nut member 9, the body of which operates more or less as a bushing between the wall of the body 1 and the threaded shank 6.

The outer end of the constrictable sleeve 9 is formed with a head 10 presenting a tapered or conical neck having a conical face 11 to seat against the tapered seat 8. The outer end of the body 1 is formed with an extension 12.

When the sleeve 9 is being placed in the nut body, or rather, after it has been placed in the nut body, the extension 12 is crimped over and bent inwardly with its concave side disposed inward (see Figures 2, 3 and 5) so as to project toward the bolt and engage the outer portion of the sleeve 9. In the present instance, this extension 12 is formed so that it tapers toward its inner edge 13 which latter presses against the adjacent end face of the sleeve.

Suitable means is provided for preventing relative rotation of the body 1 and the sleeve 9 when the nut is screwed onto the threaded shank 6. In the present instance, this is accomplished by providing correlated means on the outer face of the sleeve and on the face of the chamber 7, so that a shoulder or shoulders are presented to prevent such relative rotation. In the present instance, I provide the inner face of the chamber or socket 7 with a pair of oppositely disposed tongues or "keys" 14, and these tongues fit into correspondingly shaped grooves 15 formed in the outer face of the sleeve.

In order to enable the sleeve to be constrictable the thickness of its wall can be formed very thin at one or more points, but I prefer to construct this sleeve as a split sleeve formed with a transverse slot or gap 16 extending radially through it or through its wall.

When the forming tool or crimping tool is operating to crimp over the extension 12 to give it its collar form, I prefer to have the sleeve and nut body held on a threaded mandrel of slightly less diameter than the bolt on which the lock-nut is to be used. And when the collar is being formed its edge 13 pushes the sleeve to a slight extent down the tapered seat, as illustrated in Fig. 5. This procedure insures that a real spring-stress will be developed in the collar 12 when the nut is tightened up on a bolt of the proper diameter to cooperate with it; and also insures a "follow-up" action of the collar as the sleeve moves slightly down the tapered seat when the nut is tightened up.

If the nut is to be used in an assembly where it will not be subjected to great strain, its body can be made of a die casting, but, of course, the material of which the nut body would be formed must be of a sufficiently resilient or springy character to enable the extension 12 to be crimped over and operate as a spring in its collar form.

If the nut is required to take considerable stress, the body 1 should be made of a proper grade of steel, in which case the nut would be originally bored to a diameter equal to the diametrical distance between the adjacent faces of the two tongues 14, after which the material between these tongues would be broached out.

In applying this nut to a bolt, the mode of operation would be substantially as follows: With the sleeve 9 substantially in the position shown in Fig. 5, the nut is applied to the end of the bolt. As the sleeve is rotated onto the threads of the bolt, it would be expanded slightly by the threads of the bolt, and would move relatively back into substantially the position in which it is indicated in Fig. 2, that is to say, it would expand as far as the socket 7 would permit. The sleeve would run on the thread of the bolt until the end face or inner face 2 of the nut body 1 abuts the face of the work or plate 3, as shown in Fig. 2.

After this occurs, rotation of the nut body will, of course, cause further rotation of the sleeve so that its conical face 11 will move down on the tapered seat face 8, but only to a very slight extent, and less than that indicated in Fig. 5. Hence, a stress will be maintained in the collar 12, exerting its force in a direction urging the sleeve 9 to move further down the conical seat 8. In other words, the head 10 of the sleeve lies clamped between the conical seat 8 and the tip or edge 13 of the collar 12, and in a position that holds the sleeve constricted, and clamped against the thread of the bolt.

It is now evident that vibration or changes in temperature will not materially affect the locking action of this nut. An increase of temperature will, of course, enlarge the diameter of the chamber 7, but it would also increase the diameter of the shank 6 of the bolt no matter what the temperature is as there is always stress of a spring character maintained in the crimped collar 12.

Furthermore, when an increase in temperature occurs, the nut body 1 increases in length. Because its inner end is seated against the plate 3, the increase in length of the nut moves the inclined shoulder 8 further away from the plate 3, but as the sleeve 9 is held by its threads from moving along the axis of the nut, it follows that the conical seat 8 will ride up on the conical face 11 of the sleeve; and this, of course, develops forces all around the periphery of the conical face, acting normally to the conical surface. These forces acting inwardly in a radial plane have components acting in a plane at right angles to the axis of the nut which, of course, clamps the sleeve to the bolt, so the clamping action of the sleeve tends to increase rather than decrease, under an increase in temperature. This tightening of the sleeve caused by an increase of temperature is augmented by the spring action of the crimped collar 12 as long as it exerts its pressure against the end of the sleeve. If the nut assembly, in use, is subjected to a relatively low temperature, the length or height of the nut body 1, of course, becomes decreased to a slight extent, but the resiliency in the inturned collar 12 will maintain the faces 8 and 11 in contact with each other so that the conical face 8 will still maintain inwardly acting forces upon the head 10 of the sleeve to maintain the clamping action of the sleeve on the threads of the bolt.

Manifestly, the amount of spring force that can be exerted by the spring-collar 12 can be increased at will, by putting a greater amount of "crimp" into the collar when it is formed, in other words, by terminating the crimping operation with the edge 13 of the crimp located at a lower level than that in which it is represented in Fig. 5. Manifestly, the sleeve 9 must always be short enough to prevent its lower end from engaging the face of the work, otherwise, it would operate to limit the clamping action.

The collar 12 does not exert so great a spring pressure against the outer end of the sleeve as to interfere with free running of the nut in screwing it onto the bolt, or in taking it off, when it is necessary to make a temporary assembly by means of the nut. In making such a temporary assembly, the nut would be screwed into place until the bottom face of the nut would seat lightly upon the outer face of the part being clamped, such as the plate 3. However, this will not bring about the locking action of the nut assembly. This locking action is brought about automatically, however, and may be considered as a final locking effect that takes place only when the nut is forcibly tightened up by rotating the nut body to a substantial angle of rotation after it has seated upon the plate 3. When this occurs the spring collar 12 will still be exerting pressure against the end of the sleeve so that even under the action of vibration this automatic locking effect will be maintained, because the pressure of the spring collar against the outer end of the sleeve constantly tends to force the head 10 of the sleeve downwardly on the conical seat 8, which of course, tightens the sleeve on the threads of the bolt.

Although I have herein shown only one form of nut lock embodying my invention, it is to be understood that various changes and modifications may be made therein without departing from the spirit of my invention and the spirit and scope of the appended claim.

I claim as my invention:

A lock nut comprising: a casing and a threaded core keyed to the casing against relative rotation, the core being split throughout its entire length, the core having an inner end with a substantially cylindrical exterior surface and an enlarged end, the core having a tapered surface where the enlarged end joins the cylindrical surface, the axial length of such tapered surface being less than one-third the length of the core, and the core extending substantially beyond the tapered surface in the direction of the outer end, the casing having a cylindrical surface at its inner end, the cylindrical surface of the core being adapted under load to contact the cylindrical surface of the casing, the casing having a tapered surface complementary to the tapered surface of the core, the casing extending towards the outer end substantially beyond the tapered surface and turned in to provide a retaining ring for the core.

References Cited in the file of this patent

UNITED STATES PATENTS

| Number | Name | Date |
|---|---|---|
| 786,725 | Bryce | Apr. 4, 1905 |
| 791,825 | Scudder | June 6, 1905 |
| 1,715,990 | Chaffee | June 4, 1929 |
| 2,021,051 | Desbrueres | Nov. 12, 1935 |

FOREIGN PATENTS

| Number | Country | Date |
|---|---|---|
| 6152/27 | Australia | Feb. 27, 1927 |
| 116,503 | Australia | Feb. 11, 1943 |
| 475,334 | Great Britain | Nov. 17, 1937 |
| 502,477 | Great Britain | Mar. 16, 1939 |